(12) United States Patent
Li et al.

(10) Patent No.: US 12,488,255 B1
(45) Date of Patent: Dec. 2, 2025

(54) SYSTEMS AND METHODS FOR IDENTIFYING COMPLEMENTARY OBJECTS HAVING SIMILAR STYLES

(71) Applicant: Pinterest, Inc., San Francisco, CA (US)

(72) Inventors: Chenyi Li, San Francisco, CA (US); Kunlong Gu, Belmont, CA (US); Eric Kim, San Francisco, CA (US); Andrew Huan Zhai, San Mateo, CA (US); Charles Joseph Rosenberg, Cupertino, CA (US)

(73) Assignee: Pinterest, Inc., San Francisco, CA (US)

( * ) Notice: Subject to any disclaimer, the term of this patent is extended or adjusted under 35 U.S.C. 154(b) by 1032 days.

(21) Appl. No.: 16/918,873

(22) Filed: Jul. 1, 2020

(51) Int. Cl.
*G06N 5/04* (2023.01)
*G06F 16/248* (2019.01)
*G06F 18/214* (2023.01)
*G06F 18/22* (2023.01)
*G06N 20/00* (2019.01)
*G06V 10/22* (2022.01)
*G06V 10/56* (2022.01)

(52) U.S. Cl.
CPC .............. *G06N 5/04* (2013.01); *G06F 16/248* (2019.01); *G06F 18/2148* (2023.01); *G06F 18/22* (2023.01); *G06N 20/00* (2019.01); *G06V 10/22* (2022.01); *G06V 10/56* (2022.01)

(58) Field of Classification Search
CPC .................................. G06N 5/04; G06N 20/00
See application file for complete search history.

(56) References Cited

U.S. PATENT DOCUMENTS

2019/0318405 A1* 10/2019 Hu .......................... G06V 20/00
2020/0090039 A1* 3/2020 Song ....................... G06V 40/10

OTHER PUBLICATIONS

Yamaguchi et al, "Retrieving Similar Styles to Parse Clothing", 2015, IEEE Transactions on pattern analysis and machine intelligence, vol. 37, No. 5, pp. 1028-1040. (Year: 2015).*
Liu et al, "Hi, Magic Closet, Tell Me What to Wear!", 2012, MM '12: Proceedings of the 20th ACM international conference on Multimedia, pp. 619-628. (Year: 2012).*
Manandhar et al, "Tiered Deep Similarity Search for Fashion", 2018, Proceedings of the European Conference on Computer Vision (ECCV) Workshops, pp. 1-9. (Year: 2018).*
Wang, "Towards color compatibility in fashion using machine learning", 2019, Examensarbete, Avancerad Nivå, 30 HP Stockholm, Sverige 2019, all pages. (Year: 2019).*

* cited by examiner

*Primary Examiner* — Alexey Shmatov
*Assistant Examiner* — Clint Mullinax
(74) *Attorney, Agent, or Firm* — Haynes and Boone, LLP

(57) ABSTRACT

Described are systems and methods for determining complementary and/or matching objects based on an input query object. The described systems and methods can generate an embedding representative of the provided object, which can be transformed to generate a style embedding by a trained system, such as a machine learning system. The style embedding can then be used to identify one or more complementary objects from a corpus of classified objects. Aspects of the present disclosure also relate to creation of the training dataset, as well as training the machine learning system.

20 Claims, 10 Drawing Sheets

SYSTEMS AND METHODS FOR IDENTIFYING COMPLEMENTARY OBJECTS HAVING SIMILAR STYLES

BACKGROUND

Fashion and beauty are ever-changing areas with different trends and fads that can be difficult to follow. Also, with the sheer amount of accessible content in these areas, it can be difficult to find and navigate through content showing various outfits, looks, trends, décor, etc. In navigating the content, it can also be difficult to find outfits, décor, and other fashion accessories that may complement and/or be related to other objects.

DETAILED DESCRIPTION

Figure 1:
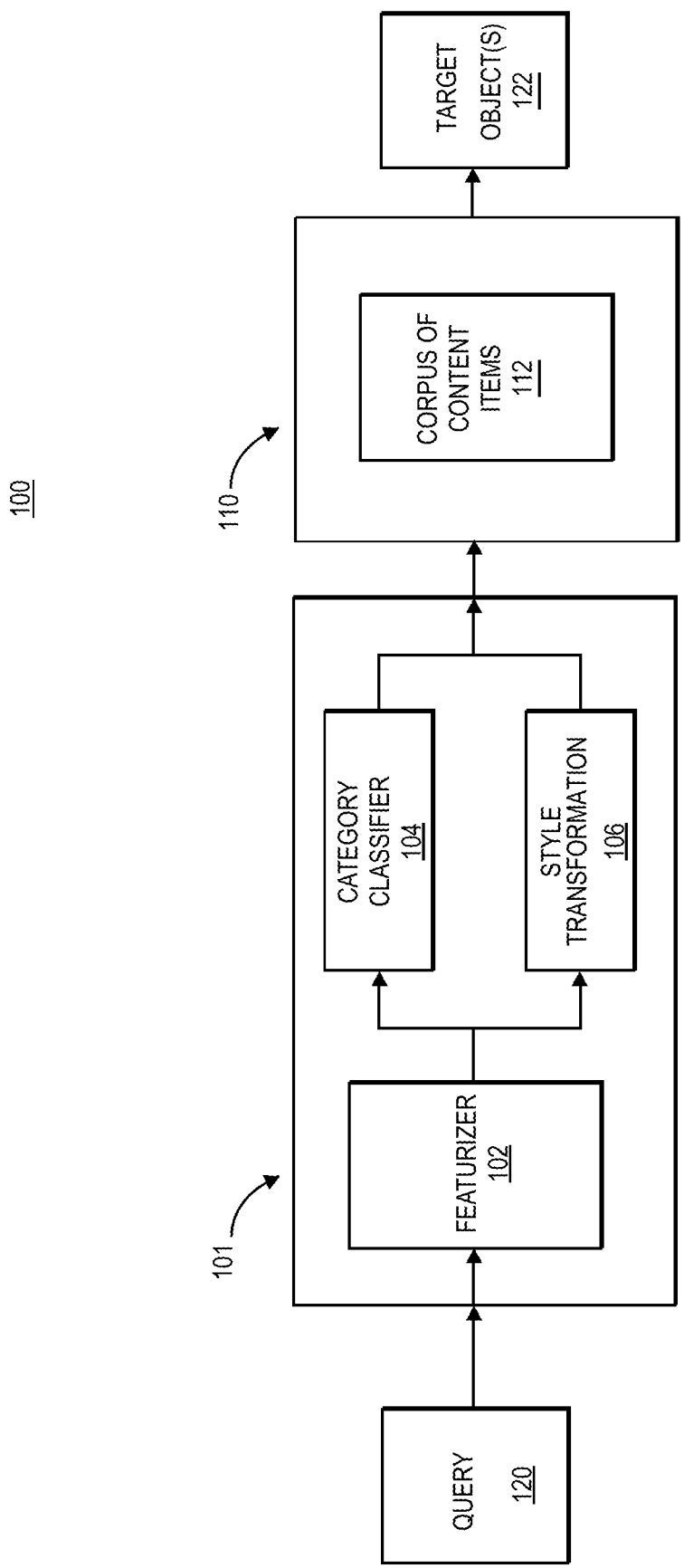
FIG. 1 is block diagram illustrating an exemplary environment using a machine learning system for determining complementary fashion objects, in accordance with embodiments of the present disclosure.

As is set forth in greater detail below, embodiments of the present disclosure are generally directed to systems and methods for identifying complementary and/or matching items and/or objects (e.g., clothing, accessories, furniture, décor, home design, event decorations, etc.) that have similar styles and can be assembled to form at least part of an outfit and/or an ensemble. For example, in the context of a fashion item, an image that includes a visual representation of a query object, such as a top (e.g., a shirt, a sweater, etc.), an accessory (e.g., jewelry, a bag, a hat, etc.), a bottom (e.g., pants, a skirt, etc.), an outerwear (e.g., a coat, a jacket, etc.), etc. can be provided, and embodiments of the present disclosure can identify, from a corpus of objects, one or more complementary and/or matching objects that have the same or a similar style to the query object. The identified complementary and/or matching objects can be combined with the query object presented in the image to form an outfit. Alternatively, in implementations not relating to fashion objects, embodiments of the present disclosure can determine a style associated with a piece of furniture (e.g., a table, a sofa, a rug, etc.), objects relating to home décor and design (e.g., flooring, tiles, stone, cabinets, wallpapers, etc.), objects relating to event design (e.g., tablecloths, napkins, chairs, hanging decorations, balloons, streamers, etc.), etc., and identify matching and/or complementary objects based on the style of the query object.

As described herein, a machine learning system (e.g., a trained classifier, a machine learning system, a deep learning system, a trained neural network, etc.) can be utilized to identify complementary and/or matching objects based on a provided query object. For example, the machine learning system can be trained to determine a style embedding associated with the query object, and the style embedding can be then used to identify the one or more complementary and/or matching objects having the same or similar styles. According to certain exemplary embodiments, the machine learning system can represent the query object using a style embedding vector, and the complementary and/or matching objects can be identified based on a distance, in the style embedding space, between the style embedding vector for the query object and the style embedding vectors associated with the objects included in a corpus of objects.

Embodiments of the present disclosure can also facilitate curating a dataset for training the machine learning system, as well as training the machine learning system with the curated dataset. As described herein, a plurality of outfits or ensembles, which may be presented in a plurality of content items, can be processed to be used as training inputs to a machine learning system. According to certain aspects of the present disclosure, an outfit or ensemble can be comprised of multiple objects presented in a single image. Alternatively, an outfit or ensemble can be comprised of multiple compatible images where each image presents one or more objects (e.g., multiple objects presented in a content pin, etc.). According to certain aspects of the present disclosure, the training data can include a corpus of content maintained on a social media platform (e.g., Pinterest "pins" and "boards," etc.). Each of the outfits or ensembles contained in the training dataset can correspond to a unique style class, and the machine learning system can be trained using the objects that make up the outfits or ensembles in the training dataset to learn that the objects that comprise a single outfit or ensemble all belong to the same respective style class. The objects presented in the content items can be isolated (e.g., via image segmentation, etc.) and assigned a type label (e.g., a shirt, a pair of pants, a pair of shorts, a hat, a jacket, a shoe, a couch, a tile, a table, a rug, etc.). The isolated and labelled object can then be provided as a training input to the machine learning system to train the machine learning system. Once trained, the machine learning system can be used to determine a style embedding for a query object, which can be used to retrieve complementary and/or matching objects, having a similar or the same style as the query object, from a corpus of objects.

While the examples discussed herein are described primarily with respect to fashion objects such as clothing and accessories, it will be appreciated that embodiments of the present disclosure may be equally applicable to other areas such as, for example, home décor, beauty products, works of art, home furnishing, interior design, landscaping, event planning (e.g., decorations, etc.), etc. For example, embodiments of the present disclosure can be used to train a machine learning model to determine style embeddings for any query object (e.g., a sofa, a wallpaper, a table, a rug, a tile, a stone, a pattern, a flooring, a tablecloth, etc.), which can be used to identify complementary and/or matching objects based on the style embedding generated for the query object.

FIG. 1 shows an exemplary block diagram of an exemplary system 100 for identifying complementary target objects based on an input query. As shown in FIG. 1, system 100 can include machine learning system 101 and retrieval system 110. According to certain embodiments, machine learning system 101 can include featurizer 102, category classifier 104, and style transformation 106, and retrieval system 110 can include a corpus of content items 112 from which complementary and/or matching target items can be identified and returned as target objects 122. Machine learning system 101 can include any trained network or machine learning system, such as a deep learning system, a trained neural network, a convolution neural network, etc., or any combination thereof. According to exemplary embodiments of the present disclosure, query 120, which can include a representation or a presentation of an object for which the user desires to identify matching and/or complementary target objects, can be provided as an input to system 100, and system 100 can identify one or more complementary and/or matching target objects 122 based on the style of object presented in query 120. For example, upon receipt of query 120, machine learning system 101 can process the object presented in query 120 to generate a category type and a style embedding vector representative of the object presented in query 120. The category type and the style embedding vector can then be provided to retrieval system 110, which can identify complementary and/or matching target objects from a corpus of content items 112 based on the category type and the style embedding vector of the object presented in query 120 that was generated by machine learning system 101.

According to exemplary embodiments of the present disclosure, query 120 can include a content item, such as an image or video, and can include a visual representation of any object, such as a fashion object (e.g., a shirt, a pair of pants, a pair of shorts, a jacket, a coat, a hat, a bag, or other accessory, a watch, a necklace, a pair of earrings, or other jewelry, a shoe, etc.) for which the user desires to identify matching and/or complementary objects having the same or similar style to the object presented in query 120. In addition to fashion objects, query 120 can include any object, such as a home furnishing (e.g., sofa, couch, table, etc.), a home décor object (e.g., wallpaper, paint, tile, fixture, etc.), etc. for which the user desires to identify matching and/or complementary objects that may have the same or similar style to the object presented in query 120. Query 120 can optionally include text inputs, filters, a target category type, etc. that the user may also provide along with the object presented in query 120.

Preferably, the object presented in query 120 is presented as a product image, where object 120 is presented alone, or with other objects, against a neutral (e.g., white, etc.) background while not being modeled or otherwise staged (e.g., on a person or mannequin, in a staged setting, etc.). Alternatively, in examples where the object presented in query 120 is not shown as a product image (e.g., shown on a person, in a staged setting, not against a neutral background, etc.), additional processing can be performed (e.g., image segmentation, background subtraction, etc.) to remove or omit pixels of the image that do not correspond to the object presented in query 120. Optionally, the object presented in query 120 can be processed to identify an official product content item associated with the object presented in query 120. An official product content item can include, for example, an identification of the actual object presented in query 120, a webpage or product listing associated with the object, a publication of the object in a catalog or other publication, etc. and may include certain metadata, such as a name/title, description, seller, etc. associated with the object presented in query 120.

First, query 120 can be processed by machine learning system 101 to generate and associate a style embedding vector that is representative of the style of the object presented in query 120. As shown in FIG. 1, the object presented in query 120 can first be processed by featurizer 102 to generate an embedding vector representative of the overall object presented in query 120. According to certain aspects of the present disclosure, a unified embedding system, Squeeze-and-Excitation Networks ("SENet"), etc., can be used to generate the embedding vector for the object presented in query 120. By way of definition and as those skilled in the art will appreciate, an "embedding vector" can include an array of values that reflect aspects and features of the source/input content. For example, an embedding vector of an object can include an array of values describing aspects and features of that object. A process, referred to as an embedding vector generator, that generates an embedding vector for input content uses the same learned features to identify and extract information, the results of which leads to the generation of the embedding vector. Embedding vectors generated by the same process on the same source content type are comparable such that a greater the similarity between the embedding vectors of two source items (e.g., object segments) indicates a greater similarity between the source items. By way of illustration and not limitation, an embedding vector may comprise 128 elements, each element represented by a 32- or 64-bit floating point value, each value representative of some aspect (or multiple aspects) of the input content. In other implementations, the embedding vector may have additional or fewer elements and each element may have additional or fewer floating-point values, integer values, and/or binary values.

Regarding embedding vector generators, typically an embedding vector generator accepts input content (e.g., an image, video, or multi-item content), processes the input content through various levels of convolution, and produces an array of values that specifically reflect on the input data, i.e., an embedding vector. Due to the nature of a trained embedding vector generator (i.e., the convolutions that include transformations, aggregations, subtractions, extrapolations, normalizations, etc.), the contents or values of the resulting embedding vectors are often meaningless to a personal examination. However, collectively the elements of an embedding vector can be used to project or map the corresponding input content into an embedding space as defined by the embedding vectors.

As indicated above, two or more embedding vectors (generated from the same content type by the same embedding vector generator) may be compared for similarity as projected within the corresponding embedding space. The closer that two or more embedding vectors are located within the embedding space, the more similar the input content from which the embedding vectors were generated. For example, objects having style embedding vectors that are closer may be considered to complementary and/or matching fashion items that can go together in an outfit.

After featurizer 102 has generated an embedding vector representative of the object presented in query 120, the embedding vector can be provided to category classifier 104 and style transformation 106 for further processing. For example, category classifier 104 can process the embedding vector to determine a predicted category type label for the object presented in query 120, and style transformation 106 can process the embedding vector to generate a style embedding vector for the object presented in query 120. According to certain aspects of the present disclosure, category classifier 104 can determine a category type label for fashion object 120, which can identify the category type for fashion object 120. This can include, for example, identifying category types such as a shirt, a pair of pants, a skirt, a dress, a pair of shorts, an accessory (e.g., sunglasses, bag, etc.), a hat, a piece of jewelry (e.g., a watch, a necklace, an earring), a shoe, etc. Additionally, style transformation 106 can generate a style embedding vector for the object presented in query 120 by performing a transformation (e.g., linear transformation, transformation using activation functions, etc.) on the embedding vector generated by featurizer 102. For example, style transformation 106 can include a trained multi-layered neural network to transform the embedding vector to generate a style embedding vector that may be associated with the object presented in query 120 and can represent a style of the object presented in query 120.

Once a style embedding vector has been generated for the object presented in query 120, retrieval system 110 can identify one or more complementary and/or matching objects from corpus of content items 112 based on the style embedding vector generated for the object presented in query 120 and the style embedding vectors associated with the objects contained in corpus of content items 112. Accordingly, the objects contained in corpus of content items 112 preferably have already been processed to have style embedding vectors generated and associated with each object contained in corpus of content items 112. Machine learning system 101 can then compare the style embedding vector associated with the object presented in query 120 with the style embedding vectors associated with the objects contained in corpus of content items 112 to find objects having the same or similar styles. Based on these comparisons, retrieval system 110 can identify objects contained in corpus of content items 112 that include the same or a similar style to that of the object presented in query 120, and can provide one or more of the identified objects as complementary and/or matching target objects 122. As described further herein, identification of objects having the same or a similar style can be based on a proximity of the style embedding vectors in the style embedding space. According to certain aspects of the present disclosure, a nearest neighbor algorithm can be performed to identify complementary and/or matching target objects 122.

Preferably, complementary target objects 122 will not include an object having the same category type associated with the object presented in query 120. Accordingly, retrieval system 110 can be configured to retrieve objects having a different category type than the category type associated with the object presented in query 120, as determined by category type classifier 104. For example, in an example where the object presented in query 120 may include a shirt, target objects 122 returned to the user may be exclude any objects having shirt as their category type. According to certain aspects of the present disclosure, query 120 can also include a target category label to filter complementary target objects 122 so that it is limited to objects having the target category type specified in query 120. For example, in an example where the object presented in query 120 may include a shirt and the target category specified in query 120 is pants, target objects 122 returned to the user may be limited to objects having pants as their category type. Alternatively, in an exemplary implementation regarding home décor, query 120 may include a representation of a table, and the target category label specifying rugs may limit the target objects 122 to rugs. Alternatively and/or in addition, complementary target objects 122 can include more than one object as to provide a complementary outfit/ensemble that matches the object presented in query 120. For example, in implementations where query 120 includes a shirt, target objects 122 can include one or more of a complementary hat, pants, shoes, etc. In implementations where the object presented in query 120 is a home décor product such as a sofa, target objects 122 may include one or more of a rug, a table, a flooring, etc.

Accordingly, to identify complementary target objects 122, the distances between style embedding vectors associated with objects contained in the corpus of content items and the style embedding vector for the object presented in query 120 can be assessed. Similarities in the style of the various fashion objects can be determined based on a distance between the style embedding vectors generated for the objects being assessed. As noted above, embedding vectors that represent the same/similar object segments will be closer together in the embedding space. Accordingly, in identifying complementary and/or matching objects, retrieval system 110 can compare the distances between the style embedding vector associated with the object presented in query 120 with the style embedding vectors associated with the objects contained in corpus of content items 112. Accordingly, the vectors that are close together (e.g., having similar or the same style) can be considered to be complementary and/or matching objects. According to certain aspects, objects determined to be the same or similar, based on the respective embedding vectors, may be clustered into a style cluster. For example, embedding vectors within a defined distance of one another may be clustered into a style cluster. Alternatively, the top twenty-five embedding vectors that are closest in distance to a selected embedding vector may be selected as representative of an objects that have the same or similar style and may therefore be identified as complementary and/or matching objects. In other implementations, all embedding vectors within a defined distance of one another may be selected as representative of the same or similar style.

Figure 2:
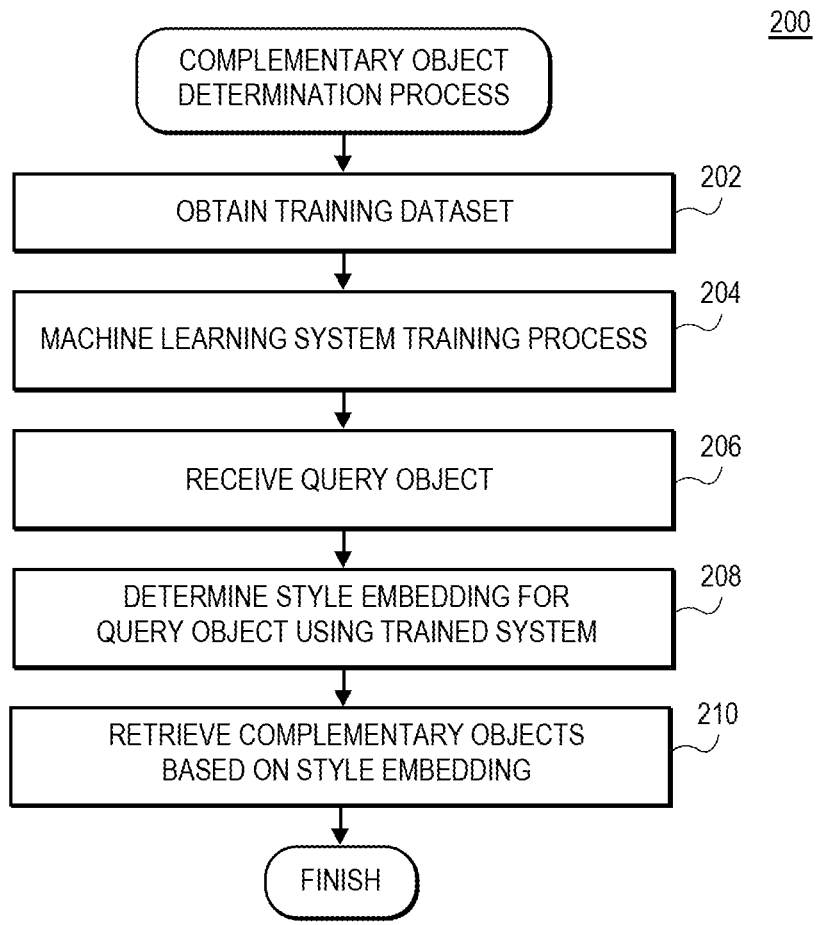
FIG. 2 is a flow diagram of an exemplary process for classifying fashion objects, in accordance with embodiments of the present disclosure.

FIG. 2 illustrates a flow diagram of an exemplary process 200 for determining complementary object(s). As shown in FIG. 2, in step 202, a training dataset for a machine learning system can be obtained. The training dataset can include a corpus of content items, where the corpus of content items present outfits and/or ensembles that share a common style. Each outfit and/or ensemble can be comprised of multiple objects that make up the respective outfit or ensemble. According to aspects of the present disclosure, each outfit or ensemble can be presented in a single image or can be presented as a collection/set of compatible images. Each of the outfits or ensembles presented in the corpus of content items can correspond to a unique style class that can be used in training the machine learning system. The creation of the training data set is discussed in more detail below in connection with FIG. 6.

Upon obtaining the training dataset for the machine learning system (e.g., style transformation 106), the training dataset can be used to train the machine learning system, as in step 204. For example, each object presented in the training dataset can be provided as a training input to a machine learning system (e.g., a machine learning system, a deep learning system, a trained neural network, etc., such as machine learning system 101). The training of the machine learning system is discussed in more detail below in connection with FIG. 7.

Once the machine learning system has been trained, it may receive an input query (e.g., query 120) presenting an object, as in step 206. As discussed further herein, the trained machine learning system can determine a style embedding for the object presented in the query (step 208). After the style embedding has been determined for the query object, complementary objects having the same or a similar style to the query object can be retrieved and returned, as in step 210.

Figure 3:
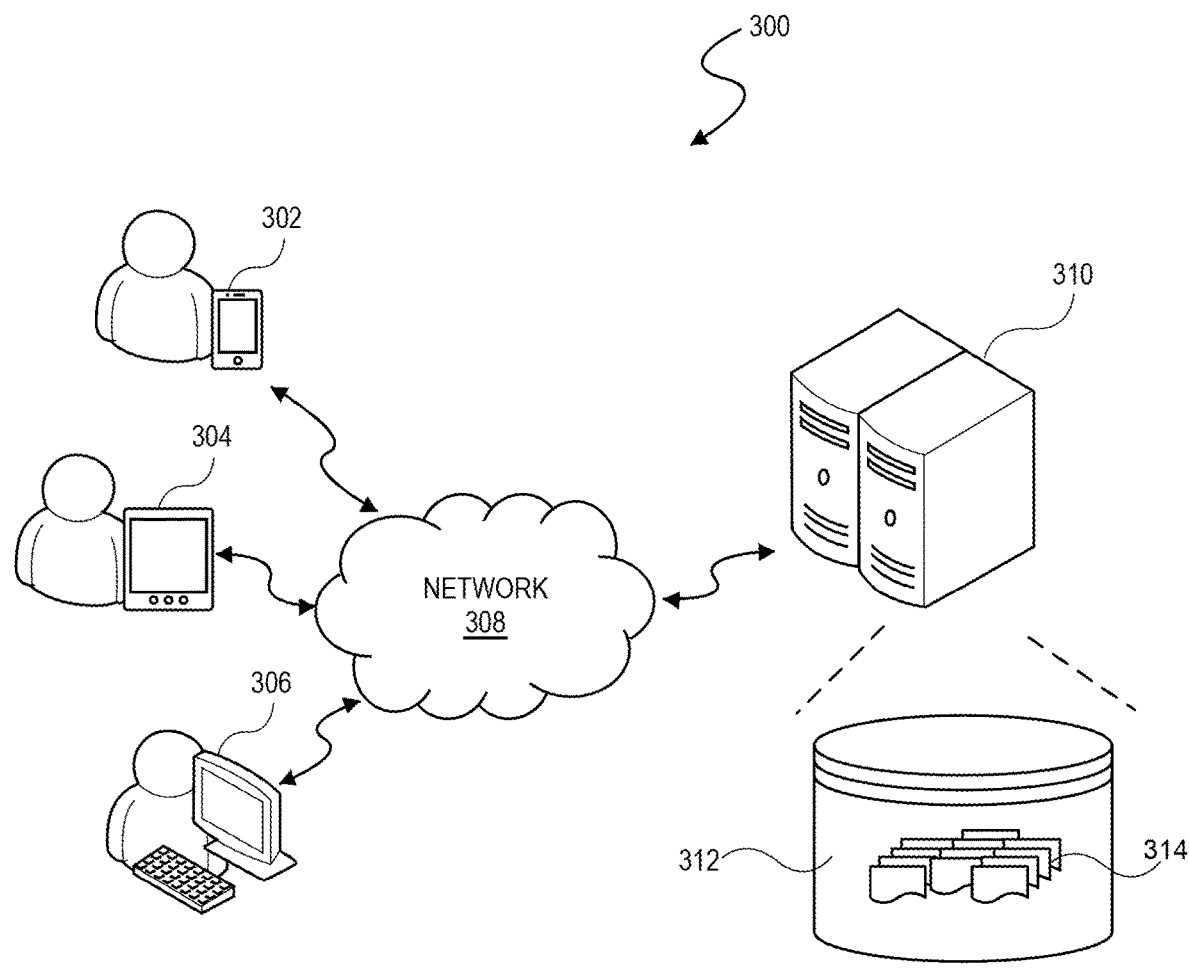
FIG. 3 is block diagram illustrating an exemplary network environment for implementing embodiments of the present disclosure.

FIG. 3 is a block diagram showing an exemplary network environment 300 according to embodiments of the present disclosure. As shown in FIG. 3, in network environment 300, users can, via client devices 302, 304, and 306, access complementary object identification content system 310 via network 308. For example, each of the users can interact with complementary object identification content system 310 via applications executed on client devices 302, 304, and 306 through network 308. Client devices 302, 304, and 306 can be any type of computing device, such as a smartphone, tablet, laptop computer, desktop computer, wearable, etc. As will be appreciated by those skilled in the art, the network 308 can include a telecommunication network over which computing devices and network enabled processes and/or services may communicate and/or exchange data. By way of illustration, a computer network such as network 308 may comprise any of a local area network or LAN, a wide area network or WAN, or combinations of the two. According to various implementations of the disclosed subject matter, the network 308 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and optical networking technologies. According to aspects of the disclosed subject matter, the personal computing devices, including user computing devices 302, 304, and 306, can communicate with the network 308 by way of a wired connection, a wireless connection, an optical connection, or any combination of these.

Also included in the exemplary network environment 300 is an online complementary object identification content system 310. As described herein, complementary object identification content system 310 can be configured to receive a query from a computer (e.g., client devices 302, 304, and 306) over the network 308 and, in response, determine complementary objects responsive to the query and return the identified complementary objects to the computer (e.g., client devices 302, 304, and 306).

As illustrated in exemplary network environment 300, and in accordance with aspects of the disclosed subject matter, complementary object identification content system 310 may utilize local, tightly coupled, and/or remote cloud-based GPU clusters, such as cloud-based GPU cluster that comprises one or more GPUs. The GPU cluster may be implemented and maintained by complementary object identification content system 310. Alternatively, and as shown in exemplary network environment 300, the GPU cluster may be implemented as an online service accessible to complementary object identification content system 310.

With regard to the processing by the GPU cluster, and many other processes, it should be appreciated that the operations of these processes are often conducted in an offline, batch mode. Indeed, processing items through a GPU-cluster (e.g., configured to implement MapReduce functionality) are made in an offline manner to produce a data set of pre-processed content that can be used by complementary object identification content system 310 to compute embedding vectors and style embedding vectors.

According to embodiments of the present disclosure, users may, via client devices 302, 304, and 306, identify and/or provide a query presenting an object (e.g., query 120) to complementary object identification content system 310. This can include, for example, any content (e.g., images, videos, etc.) that may include a representation of an object (e.g., a shirt, a pair of pants, a shoe, a hat, a sofa, a table, a rug, a tile, a wallpaper, etc.). According to aspects of the present disclosure, the content item can include an image generated using one or more cameras of the client devices 302, 304, and 306, an image from memory of client devices 302, 304, and 306, an image stored in a memory that is external to client devices 302, 304, and 306, an image provided by complementary object identification content system 310, and/or an image from another source or location. Preferably, the query object can be presented in a product image format, where the one or more objects are presented alone (e.g., without any people, models, not in a staged setting, etc.) against a neutral background. Alternatively, in examples where the object is not shown as a product image (e.g., shown on a person, not on a neutral background, in a staged setting, etc.) additional processing can be performed (e.g., image segmentation, background subtraction, etc.) to remove or omit pixels of the image that do not correspond to the object.

Complementary object identification content system 310 can then process the query object to determine a style embedding vector representative of the style and associate the embedding vector with the object. For example, content system 310 can include a trained machine learning system (e.g., machine learning system 101) that can determine a style embedding vector for the query object. According to one aspect of the present disclosure, the trained classifier can generate a style embedding vector representative of the style of the query object. Additionally, a category type can also be determined for the query object by the trained machine learning system (e.g., a shirt, a pair of pants, a skirt, a dress, a pair of shorts, an accessory, a shoe, etc.).

Based on the style embedding vector generated for the query object, complementary object identification content system 310 can identify one or more complementary and/or matching objects from data store 312, which can store and maintain a corpus of content items 314. For example, the objects contained in corpus of content items 314 preferably have already been processed for style embeddings and preferably include style embedding vectors for each object. Complementary object identification content system content system 310 can then compare the style embedding vector associated with the query object to the style embedding vectors associated with the objects contained in corpus of content items 314 to identify objects having similar or the same style. Based on these comparisons, complementary object identification content system 310 can identify and return one or more objects contained in corpus of content items 314 having a style that is the same as or similar to that of the query object. These identified objects can be provided as complementary and/or matching objects for presentation on client devices 302, 304, and 306.

As described further herein, objects having similar or the same style may include style embedding vectors that are closer together in the style embedding space. For example, style embedding vectors within a defined distance of one another may be clustered into a style cluster. For example, the top twenty-five style embedding vectors that are closest in distance to a selected style embedding vector may be selected as representative of objects having the same or similar styles and therefore may be identified and returned as complementary and/or matching objects. In other implementations, all style embedding vectors within a defined distance of one another may be selected as objects that are representative of having the same or similar style.

Preferably, the identified complementary objects will not include an object having the same category type associated with the query object provided by the user. According to certain aspects of the present disclosure, a target category label can be provided by the user along with the query object, via client devices 302, 304, and 306, to filter the identified complementary objects so that it is limited to objects having the target category type specified by the user. Alternatively and/or in addition, the complementary objects can include more than one object so as to provide an entire complementary outfit or ensemble that matches the query object provided by the user.

Figure 4A:
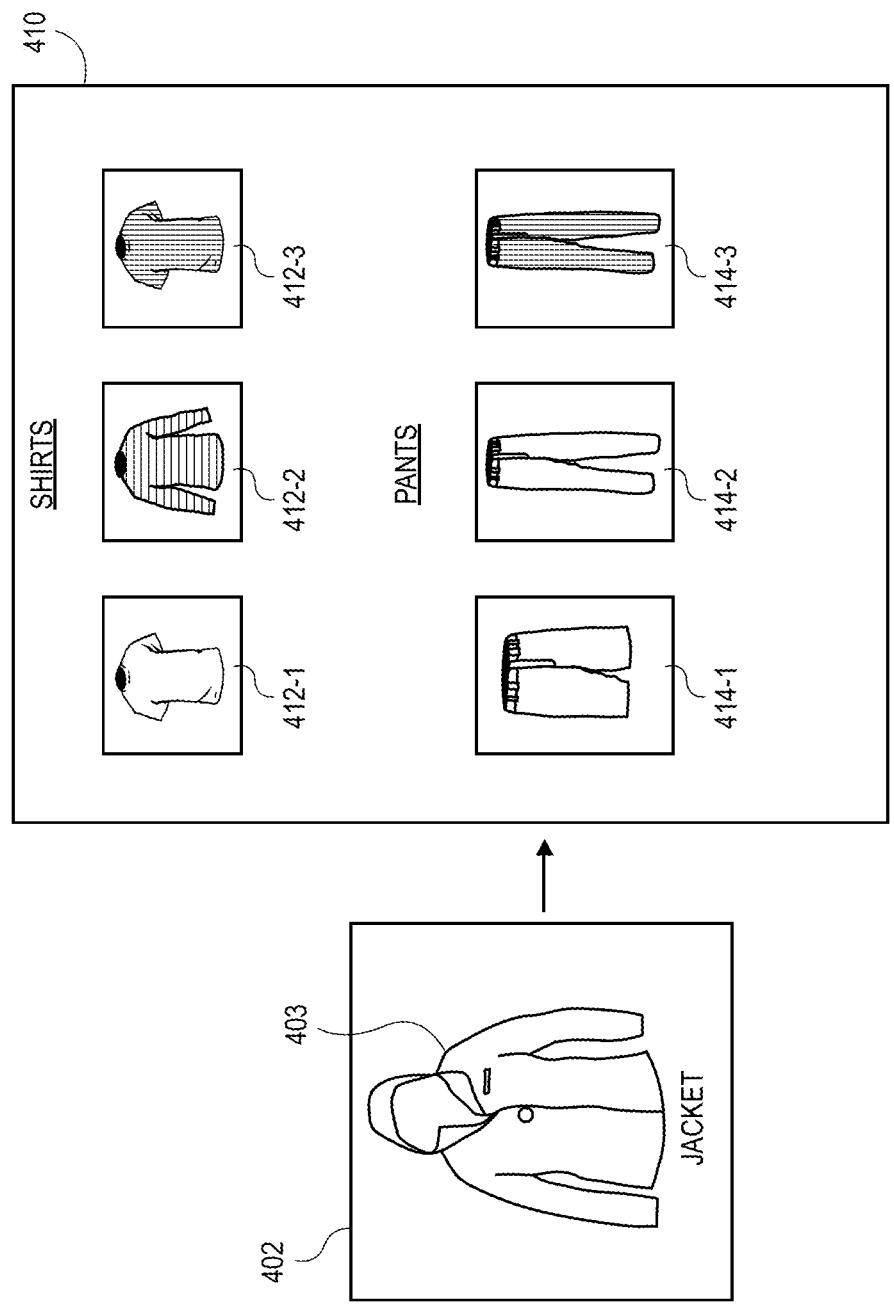
FIGS. 4A and 4B are representations of an exemplary presentation of identified fashion objects, in accordance with embodiments of the present disclosure.
Figure 4B:
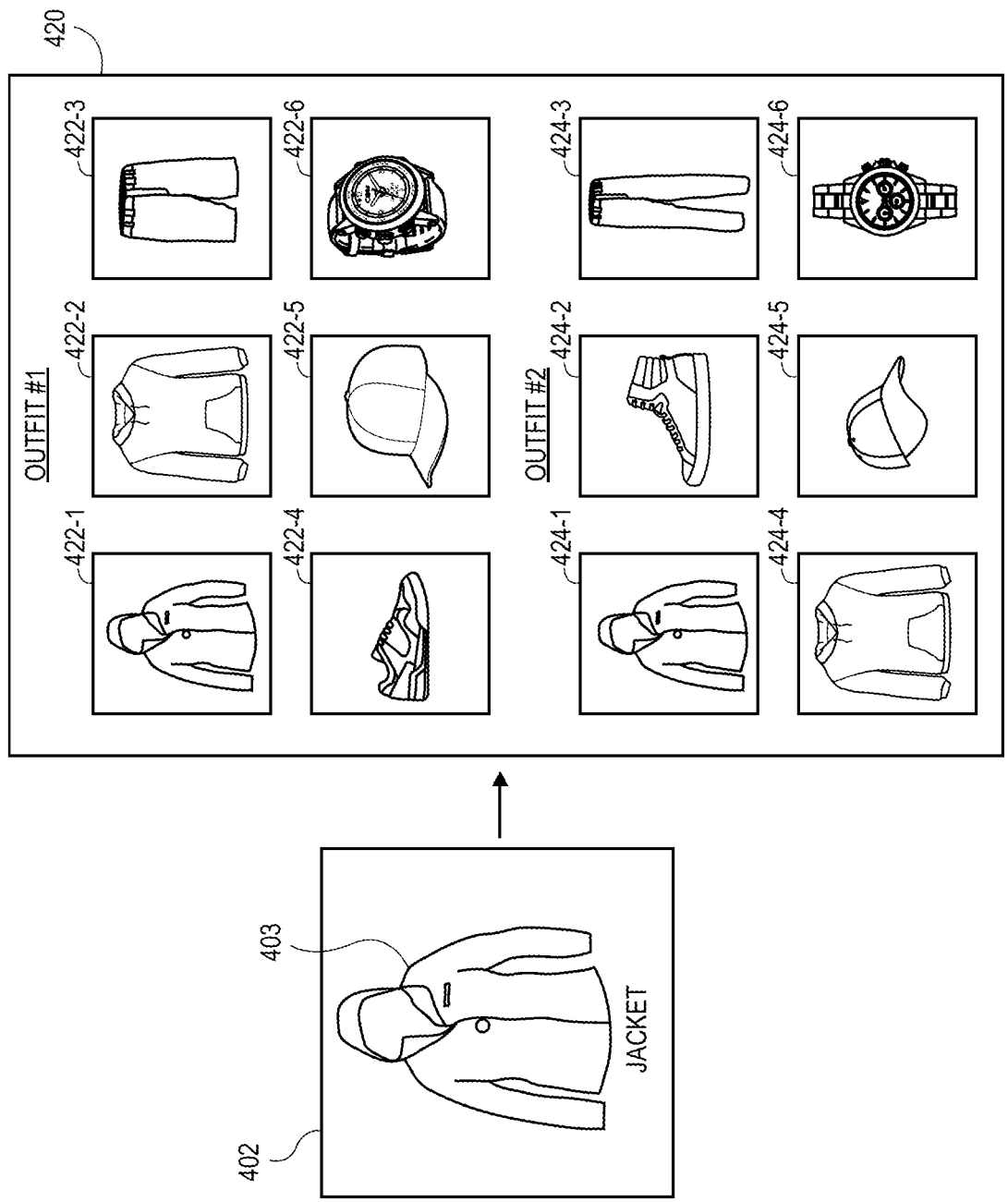

FIGS. 4A and 4B are illustrations of exemplary user interfaces that may be presented on a client device in determining complementary fashion objects in accordance with embodiments of the present disclosure.

As shown in FIGS. 4A and 4B, a user may select or provide query 402, which can include a visual representation of fashion object 403, via a client device. In the embodiment shown in FIGS. 4A and 4B, fashion object 403 may include a jacket. Alternatively, fashion object 403 can include any fashion object for which the user is searching for one or more complementary or matching fashion objects, such as a shirt, a pair of pants, a jewelry piece, a shoe, etc. According to other embodiments, query 402 can include multiple fashion objects, and the user may select one of the multiple fashion objects for processing to identify complementary and/or matching fashion objects.

Upon selection or provisioning of fashion object 403, fashion object 403 can be provided, for example, to a trained machine learning system (e.g., machine learning system 101) for processing and determination of one or more complementary and/or matching fashion objects. Although query 402 is shown substantially as a product image where fashion object 403 is shown against a plain, white background, in implementations where query 402 is not a product image, preprocessing may be performed on query 402 to segment and isolate fashion object 403.

The trained machine learning system (e.g., machine learning system 101) may process fashion object 403 to determine a category type and generate a style embedding vector that is representative of a style of fashion object 403. As described herein, the style embedding vector can be generated by a trained machine learning system. For example, the trained machine learning system may have been trained on a training dataset presenting certain outfits and/or ensembles.

After the trained machine learning system has determined a category type classification (e.g., using category classifier 104) and a style embedding vector (e.g., using style transformation 106) for fashion object 403, the style embedding vector can then be used to identify and provide for presentation complementary fashion objects 410 that may have the same or similar style as fashion object 403. As shown in FIG. 4A, the identified complementary fashion objects can include shirts 412-1, 412-2, and 412-3, and pants 414-1, 414-2, and 414-3. According to certain aspects of the present disclosure, in examples where the user may have specified a category type (e.g., a shirt, a pair of pants, etc.) as part of query 402, the complementary fashion objects 410 may be limited to fashion objects of the category type specified by the user. For example, if the user had specified a category type of shirts, only shirts 412-1, 412-2, and 412-3 may be presented to the user. In another example, if the user had selected pants, only pants 414-1, 414-2, and 414-3 may be displayed.

Alternatively and as shown in FIG. 4B, instead of individual fashion objects 412 and 414, embodiments of the present disclosure can also identify and present one or more complementary outfits 420, which can include multiple fashion objects 422 and 424, that may have the same or similar style as fashion object 403 to the user. As shown in FIG. 4B, a first complementary outfit including jacket 422-1, top 422-2, shorts 422-3, shoe 422-4, hat 422-5, and watch 422-6 can be provided, where each of jacket 422-1, top 422-2, shorts 422-3, shoe 422-4, hat 422-5, and watch 422-6 has the same or similar style as fashion object 403. According to certain aspects, jacket 422-1 can be the same fashion object as fashion object 403 which was provided by the user. Similarly, the second complementary outfit can include jacket 424-1, shoe 424-2, pants 424-4, top 424-4, hat 424-5 and watch 424-6, where each of jacket 424-1, shoe 424-2, pants 424-4, top 424-4, hat 424-5 and watch 424-6 has the same or similar style as fashion object 403. According to other embodiments of the present disclosure, any complementary outfits can include any number and category types of fashion objects. Further, in examples where a user may specify a target category type as part of query 402, any presented complementary outfits may be required to include at least one fashion object from the specified target category type. For example, the user had specified a target category type of shirts, each complementary outfit presented to the user will preferably include at least one shirt.

Figure 5:
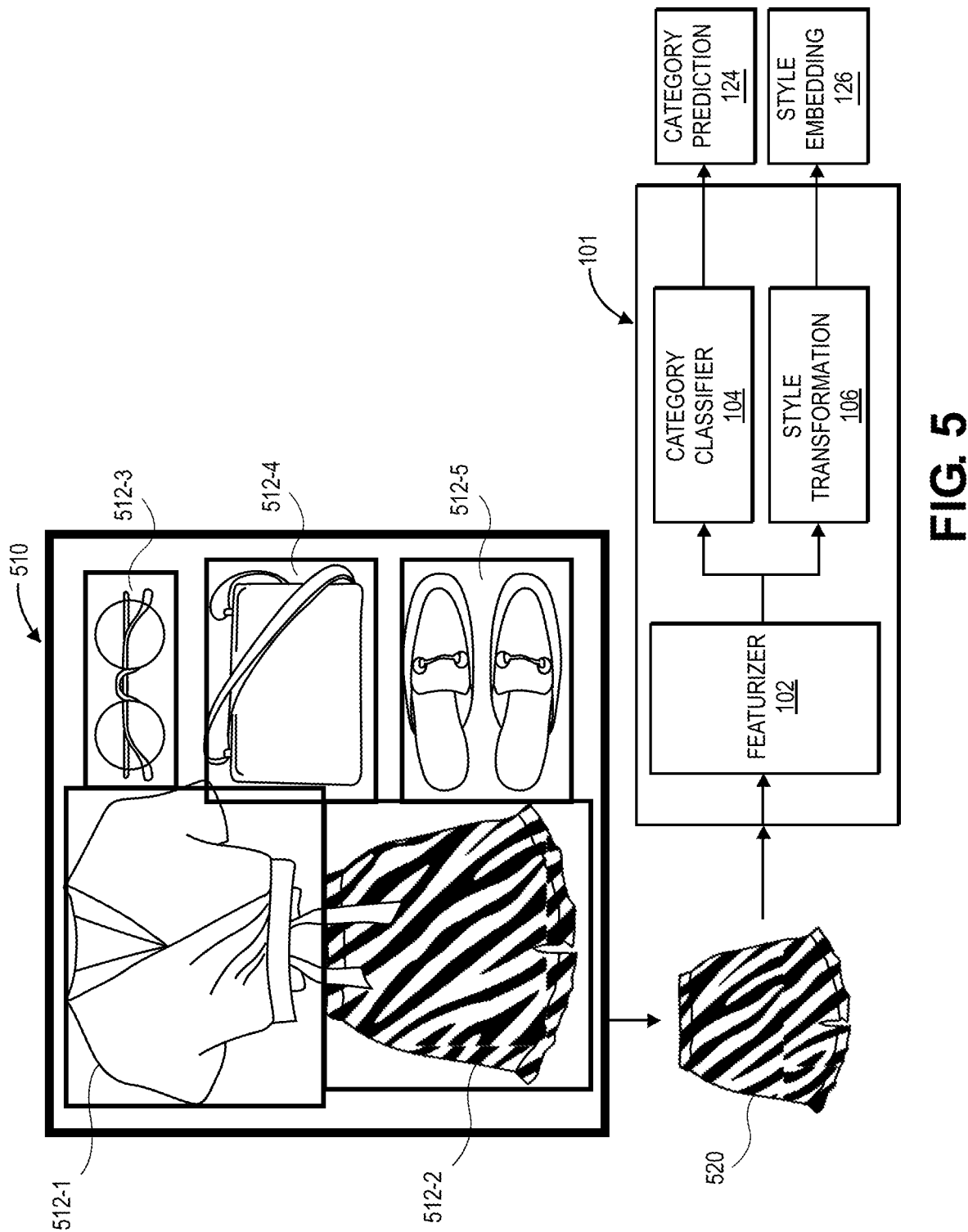
FIG. 5 is block diagram illustrating an exemplary environment for training a machine learning system, in accordance with embodiments of the present disclosure.

FIG. 5 shows an exemplary block diagram of training machine learning system 101 according to embodiments of the present disclosure. As shown in FIG. 5, machine learning system 101 can be trained by repeated iterations of processing a training dataset created from a corpus of content items that includes various objects. Preferably, the corpus of content items presents a plurality of outfits or ensembles, where each outfit or ensemble is comprised of more than three or more objects. Accordingly, objects that make up a single outfit or ensemble are assumed to have the same style and can therefore correspond to a unique style class. Further, each of the outfits or ensembles can be presented in a single image or in a set of compatible images. According to certain aspects, the training dataset can include over 1,500,000 outfits presented in over 4,000,000 images. Further, the training dataset can be monitored to ensure that the outfits and ensembles presented therein are consistent with current fashions, trends, etc. This can be accomplished by time limiting the content items (e.g., limiting the age of the content items to 1 year, 2, years, etc. to ensure the content items are not presenting stale, out of date outfits and/or ensembles). Alternatively and/or in addition, activity of the content items (e.g., likes, re-pins, etc.) can be monitored and only content items having a threshold level of activity may be utilized in the training dataset to ensure that popular outfits and/or ensembles, which can be indicative of a quality of the outfit, are utilized in training the model.

Preferably, the content items used to train the machine learning system include a visual representation of one or more objects presented as a product image (e.g., the objects alone shown against a neutral background). Alternatively, any content item not presenting the objects as a product image may be processed (e.g., image segmentation, background subtraction, etc.) to isolate the objects and present the objects on a neutral background.

As shown in FIG. 5, content item 510 can be an exemplary content item contained in a corpus of content items from which the training dataset is created. Content item 510 can include one or more objects 512 that can be considered to form an outfit. Although content item 510 is shown having top 512-1, shorts 512-2, glasses 512-3, bag 512-4, and shoes 512-5, each content item included in the corpus of content items can include any number and type of objects. Alternatively, an outfit or ensemble can be composed of objects shown in a set of compatible images. Preferably, the objects are presented in a product image format where the objects are presented alone against a neutral background. Alternatively, in examples where the objects are not presented as a product image (e.g., shown on a person, not on a neutral background, in a staged setting, etc.), additional processing can be performed (e.g., image segmentation, background subtraction, etc.) to remove or omit pixels of the image that do not correspond to the objects.

For the content items used to train machine learning system 101, each object contained can be detected. Once each object is detected, a category type (e.g., a shirt, a shoe, a watch, a hat, etc.) can be determined and associated with the object, and a bounding box can be drawn around each object. As shown in FIG. 5, for content item 512, bounding boxes are shown having been drawn around top 512-1, shorts 512-2, glasses 512-3, bag 512-4, and shoes 512-5. Next, the content items can be processed to remove certain objects from the corpus of content items. For example, the size of the bounding boxes can be determined and objects having bounding box size below a certain threshold size can be removed. Additionally, a color diversity can be determined for the object, and objects having a color diversity below a certain threshold can also be removed. In yet another example, the category type associated with each object can be processed to ensure that no object has more than one associated category type label. Any object with more than one category type label can also be removed.

After certain content items and/or objects have been removed through the processing described above, each object can be provided as a training input to machine learning system 101. As shown in FIG. 5, shorts 512-2 can be provided as object 520 as a training input to machine learning system 101. Featurizer 102 can process object 520 to generate an embedding vector representative of object 520. For example, a unified embedding system can be used to generate a visual embedding vector for object 520. After featurizer 102 has generated an embedding vector representative of object 520, category classifier 104 can process the embedding vector to determine a predicted category type label 124 for object 520, and style transformation 106 can transform the embedding vector to generate a style embedding vector 126 for object 520. For example, style transformation 106 can include a trained multi-layered neural network to transform (e.g., linear transformation, transformation using activation functions, etc.) the embedding vector generated by featurizer 102 to generate a style embedding vector 126. Category type labels can identify the category type for object 520 and the style embedding vector for object 520 can represent the style for object 520. The category type label can include, for example, category types such as a shirt, a pair of pants, a skirt, a dress, a pair of shorts, an accessory (e.g., sunglasses, bag, etc.), a hat, a piece of jewelry (e.g., a watch, a necklace, an earring), a shoe, etc. Further, the style embedding vector for object 520 can represent the style for fashion object 520. The style embedding vector can be representative of a style of fashion object 520. This can include, for example, characteristics of fashion object 520, such as, for example, color, pattern, cut, fit, materials, etc. of object 520 and the outfit of which it is a part.

Based on the style embedding vector, machine learning system 101 can identify objects having similar or the same style as object 520. For example, since each outfit or ensemble corresponds to a unique style class, in an ideal system exhibiting no loss, machine learning system 101 would identify and return the objects included in the same outfit or ensemble as the input object. In the implementation illustrated in FIG. 5, the ideal system would identify and retrieve, for example, top 512-1, glasses 512-3, bag 512-4, and shoes 512-5 when provided with object 520. Accordingly, in training machine learning system 101, the fashion items identified and returned by machine learning system 101 can be assessed and evaluated. For example, a triplet loss training architecture can be employed, where the input object is the anchor, the positive can be any of the other objects included in the same outfit or ensemble as the input object (e.g., in the same unique style class), and the negative can be any randomly selected object not in the same outfit or ensemble as the input object (e.g., not in the same unique style class). Accordingly, in connection with FIG. 5, when object 520 is provided as an input (e.g., the anchor), it can be determined whether machine learning system 101 is able to identify and return at least one of objects 512-1, 512-3, 513-4, and 512-5 (e.g., a positive), or if it returns a different object (e.g., a negative). The objects identified and returned by machine learning system 101 can be scored, and various of parameters (e.g., elements, nodes, equations, comparisons, etc.) of machine learning system 101 can be updated for each iteration until a threshold accuracy is achieved.

Figure 6:
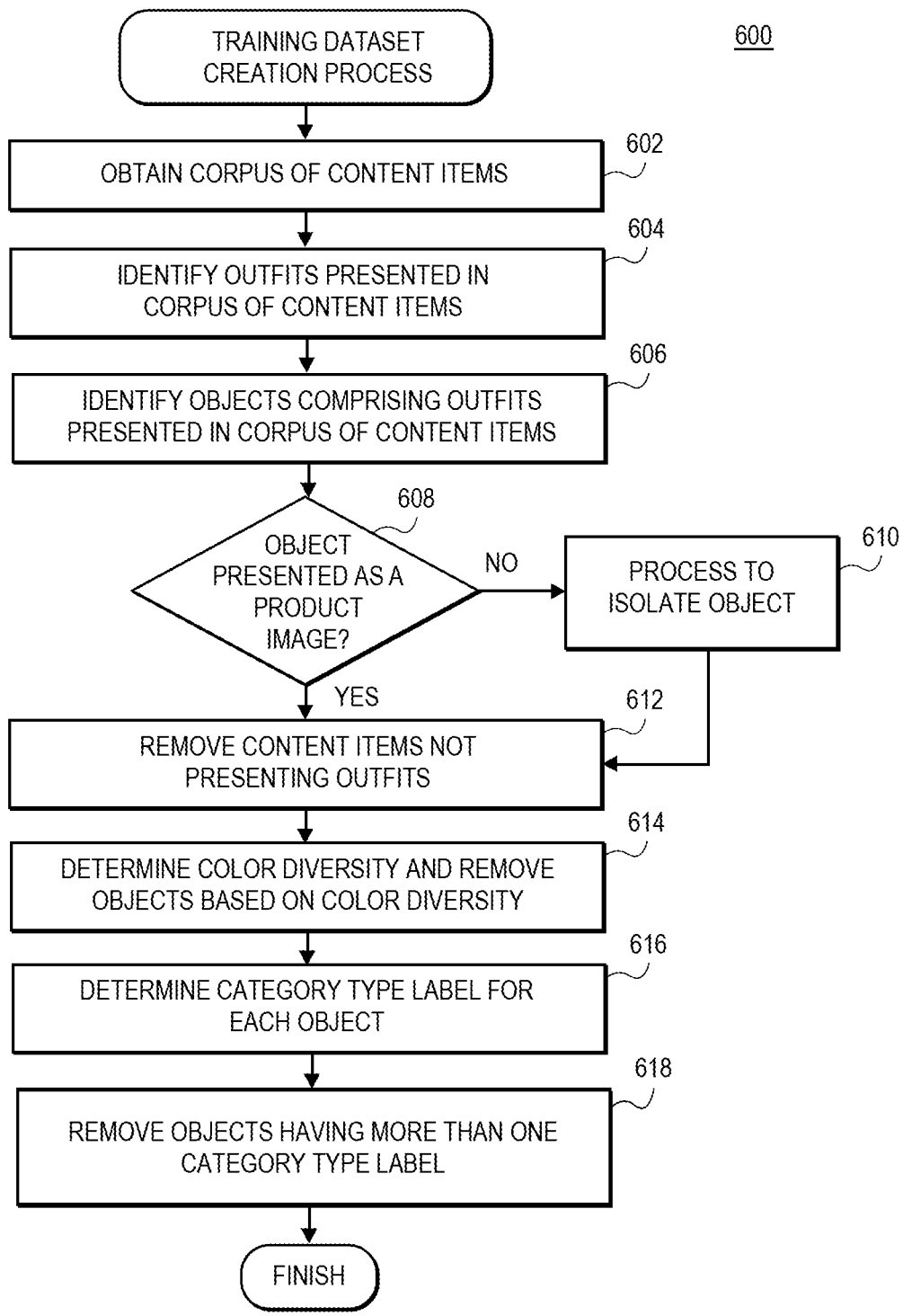
FIG. 6 is a flow diagram of an exemplary process for creating a training dataset, in accordance with embodiments of the present disclosure.
Figure 7:
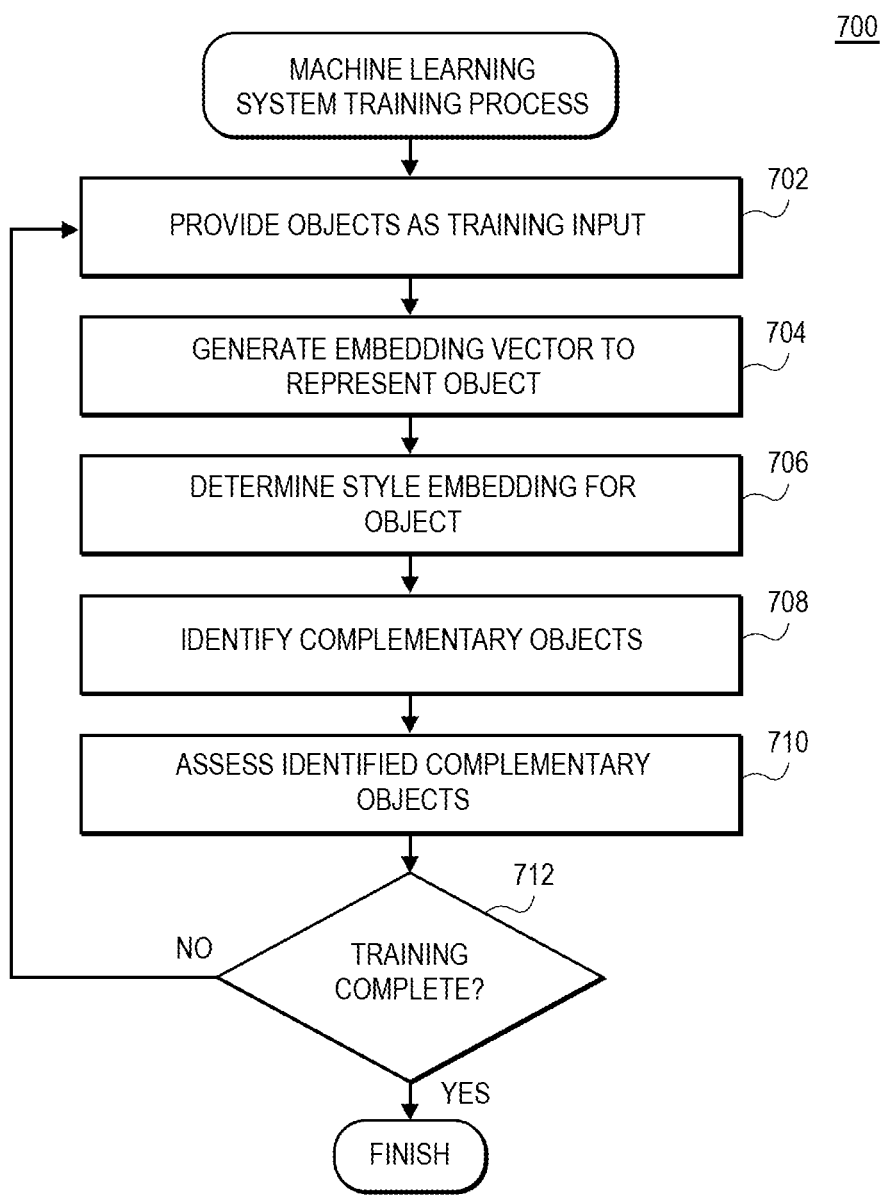
FIG. 7 is a flow diagram of an exemplary process for training a classifier, in accordance with embodiments of the present disclosure.

FIGS. 6 and 7 are exemplary flow diagrams for processes associated with the training of a machine learning system, such as machine learning system 101.

FIG. 6 illustrates a flow diagram of an exemplary process 600 for creating a training dataset for training a machine learning system, such as machine learning system 101. As shown in FIG. 6, a corpus of content items is identified in step 602. In step 604, outfits presented in the corpus of content items are identified, and in step 606, the objects comprising each outfit can be identified. As described herein, each outfit can be presented in a single image or in a set or collection of compatible images. It can then be determined, in step 608 whether each content item is presented as a product image (e.g., the object alone against a neutral background). In the event that the content item is not presented as a product image, the content item can be processed to isolate the fashion objects, as in step 610. This can include, for example, performing image segmentation and background subtraction algorithms.

Next, the content items that do not include representations of an outfit can be removed (step 612). For example, an outfit can be defined as a collection of three or more different types of objects (e.g., a shirt, a skirt, and a shoe, or a jacket, a watch, and a necklace, etc.) presented in a single image or a set of compatible images. Alternatively, an outfit can be defined as any number of different types of objects (e.g., 2 different fashion object types, 4 different fashion object types, 5 different fashion object types, 6 different fashion object types, 7 different fashion object types, etc.). As discussed herein, each outfit can form the basis for a unique style class in training the machine learning system.

In step 614, a color diversity of each of the objects can be determined, and the objects not having a color diversity that exceeds a certain threshold can be removed. For example, a dominant color can be determined and if there is insufficient variation from the dominant color, the object may be removed as not having a color diversity that exceeds a certain threshold. Next, a category type label is determined for each object (in step 616). This can be based on, for example, whether the object is a shirt, a jacket, a hat, a shoe, etc. Then, in step 618, any object with more than one associated category type label can be removed. For example, if the content image includes an image of a shirt and a jacket and the system is unable to separate the two objects and labels the object as both a shirt and a jacket, the object may be removed. After these content items have been removed, the process ends and the content items remaining in the corpus of content items can be used as the training dataset to train a machine learning system, such as machine learning system 101.

FIG. 7 illustrates a flow diagram of an exemplary process 700 for training a machine learning system, such as machine learning system 101. As shown in FIG. 7, a plurality of objects can be provided as training inputs to the machine learning system, as in step 702. This can include, for example, the objects included in the training dataset that results from the performance of process 600. Next, in step 704, an embedding vector that represents the object can be generated. For example, the embedding vector can be representative of the object and can be generated by, for example, featurizer 102.

Based on the embedding vector, a transformation can be performed to generate a style embedding for the object (step 706). For example, the embedding vector can be transformed into the style embedding vector, which can be representative of the style of the fashion object, using a multi-layered neural network. Based on the style embedding, complementary objects can be identified, as in step 708. This can include objects that include similar or the same style as the object.

During the training, the identified complementary objects can be assessed to evaluate the performance of the machine learning system. For example, a triplet loss training architecture can be employed, where the input object is the anchor, the positive can be any of the other objects included in the same outfit or ensemble as the input object (e.g., in the same unique style class), and the negative can be any randomly selected object not in the same outfit or ensemble as the input object (e.g., not in the same unique style class). Accordingly, it can be determined whether the identified complementary objects belong to the same outfit or ensemble as the input object. The objects identified and returned by the machine learning system can be evaluated, and various parameters (e.g., elements, nodes, equations, comparisons, etc.) of the machine learning system can be updated for each iteration. In step 712, it can be determined if training of the classifier is complete (e.g., the performance can be scored and measured against an acceptable accuracy threshold, if all the training objects have been processed, etc.), and if training is incomplete, process 700 can be iteratively performed until training is complete.

Figure 8:
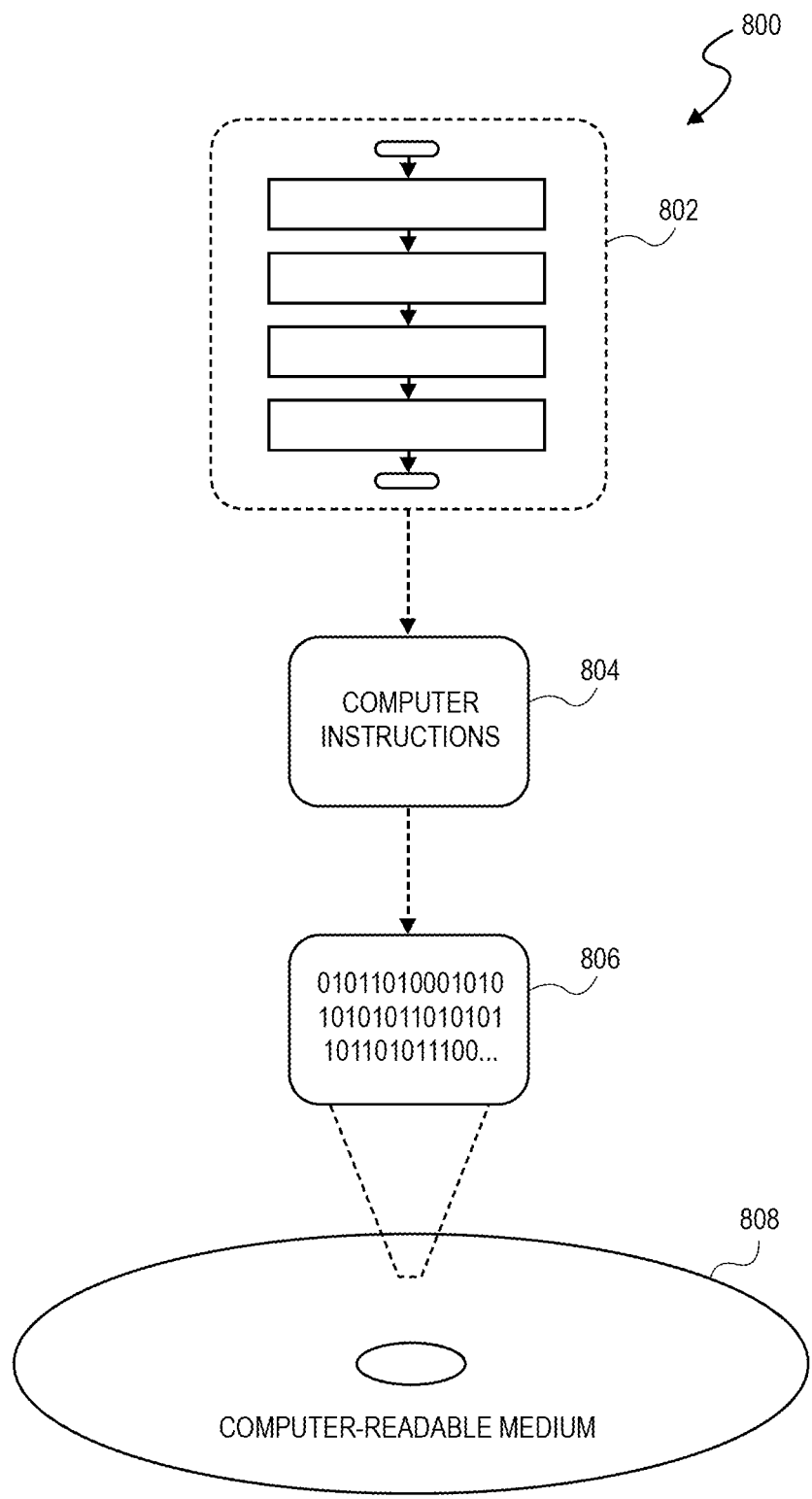
FIG. 8 is a block diagram illustrating an exemplary computer readable medium encoded with instructions, in accordance with embodiments of the present disclosure.

FIG. 8 is block diagram illustrating an exemplary computer readable medium 800 encoded with instructions for executing the disclosed implementations. More particularly, the implementation can include a computer-readable medium 808 (e.g., a CD-R, DVD-R or a platter of a hard disk drive), on which is encoded computer-readable data 806. This computer-readable data 806 in turn can include a set of computer instructions 804 configured to operate according to one or more of the principles set forth herein. In one such implementation 802, the processor-executable instructions 804 may be configured to perform a method, such as at least some of exemplary processes 600, 700, and 800, for example. In another such implementation, the processor-executable instructions 804 may be configured to implement a system on a computing device, such as at least some of the exemplary, executable components of computing device 900 of FIG. 9, as described below. Many such computer readable media may be devised, by those of ordinary skill in the art, which are configured to operate in accordance with the implementations presented herein.

Figure 9:
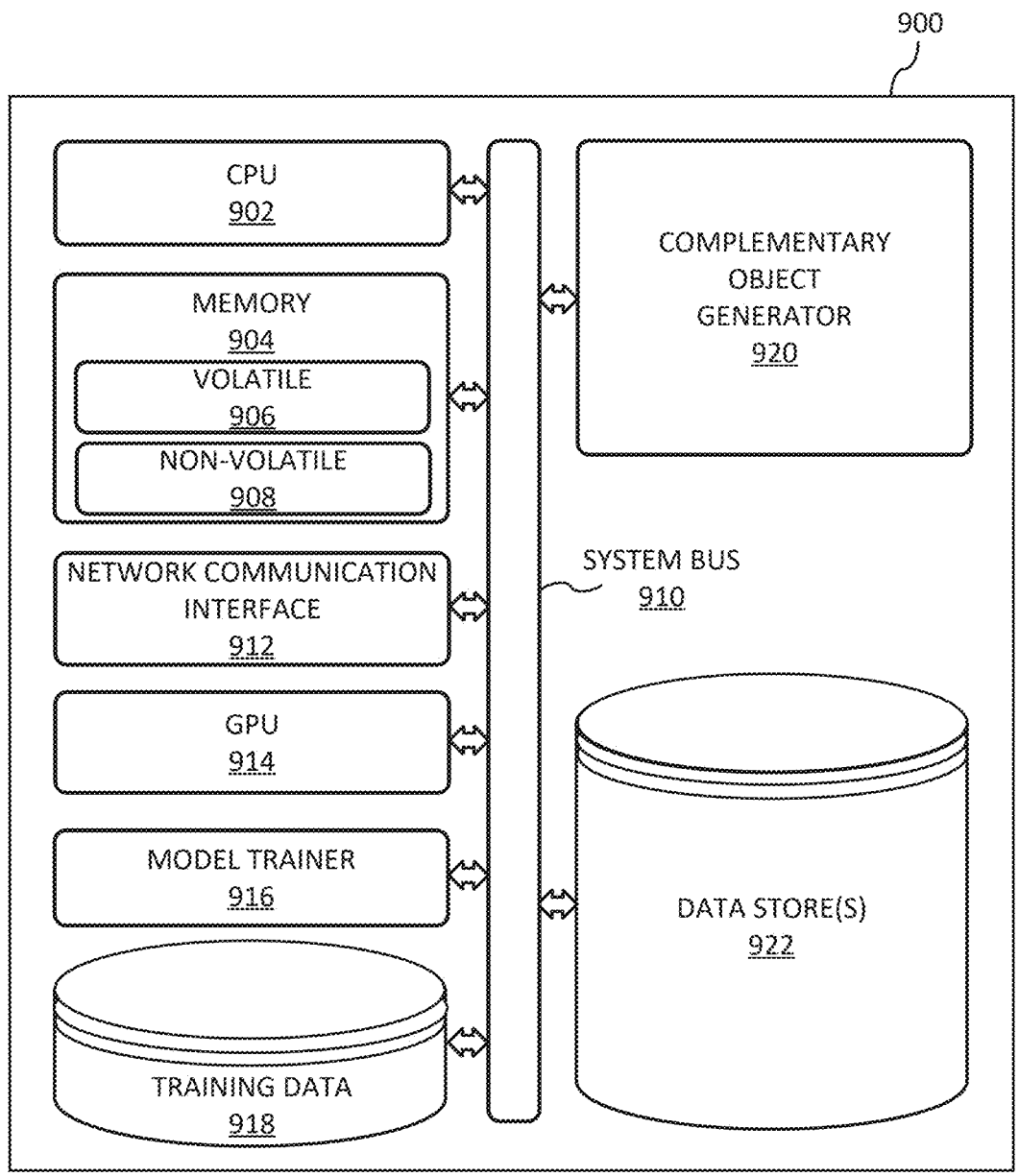
FIG. 9 is a block diagram illustrating an exemplary computing system (or computing device) configured for implementing embodiments of the present disclosure.

FIG. 9 is a block diagram illustrating an exemplary computing system 900 (or computing device) suitably configured for implementing the described implementations. Computing system 900 typically can include one or more processors (or processing units), such as processor 902, and further includes at least one memory 904. The processor 902 and memory 904, as well as other components of the computing system, are interconnected by way of a system bus 910.

As will be appreciated by those skilled in the art, the memory 904 typically (but not always) includes both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM, solid-state memory devices, memory storage devices, and/or memory cards are examples of non-volatile memory 908.

As will be further appreciated by those skilled in the art, the processor 902 executes instructions retrieved from the memory 904, from computer readable media, such as computer readable media 808 of FIG. 8, and/or other executable components in carrying out the various described implementations. The processor 902 may be comprised of any of a number of available processors such as single-processor, multi-processor, single-core units, and multi-core units, which are well known in the art.

Further still, the illustrated computing system 900 typically also includes a network communication interface 912 for interconnecting this computing system with other devices, computers and/or services over a computer network, such as network 308 of FIG. 3. The network communication interface 912, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 912, is typically comprised of hardware and/or firmware components (and may also include or comprise executable software components) that transmit and receive digital and/or analog signals over a transmission medium (i.e., the network).

The illustrated computing system 900 also includes a graphics processing unit (GPU) 914. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied convolution processes of a machine learning model/neural network that manipulate large amounts of data, as described above. Indeed, one or more GPUs, such as GPU 914, are viewed as essential processing components when conducting machine learning technique. Also, and according to various implementations, while GPUs are often included in computing systems and available for processing convolutions of machine learning models, such as GPU 914 of computing system 900, multiple GPUs are also often deployed as online GPU services or farms and machine learning processing is advantageously directed to conducting the various layers/convolutions of a neural network as described in regard to the exemplary network environment 300 of FIG. 3.

The computing system 900 further includes an executable complementary object generator 920. In execution on the computing system 900, the complementary object generator 920 operates in a similar manner to that described herein. Indeed, the complementary object generator 920 receives the herein described objects as inputs and identifies one or more complementary and/or matching objects.

As mentioned above, machine learning models comprising multiple layers of processing are best performed by GPUs, such as GPU 914, rather than central processing units (CPUs), such as CPU 902. Indeed, GPUs are specifically designed to manipulate large amounts of memory and perform floating point operations on a faster and larger scale than are CPUs. This is significant when processing large data sets comprising data-rich items of content, such as images. Indeed, the abilities of the GPU allow the machine learning models to solve linear algebra equations, conduct statistical analysis, regressions, and the like in an efficient and speedy manner, especially when compared to that same work on a CPU. On the other hand, while GPUs excel in processing floating point operations and manipulating large amounts of memory, CPUs can be effectively and efficiently directed to identifying the information and/or data that one or more GPUs should process.

Also shown in the exemplary computing system 900 is an executable model trainer component 916 and a body of training data 918. As discussed above, and according to aspects of the disclosed subject matter, the model trainer 916 can be configured to efficiently and accurately train machine learning system 101 using an iterative process.

The system 900 may also include or be connected with one or more data stores 922. Data stores 922 may maintain any of a variety of information including, but not limited to user profiles, scenes, links between objects or object segments and scenes, embedding vectors, etc.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6-8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    obtaining a plurality of outfits represented in a plurality of content items, each of the plurality of outfits including a visual representation of a respective plurality of objects;
    for each of the plurality of outfits:
        isolating each object from the respective plurality of objects into a bounding box object representative of the object;
        assigning a category type label for each bounding box object; and
        determining a color diversity for each object;
    generating a training dataset from the respective plurality of objects by removing, based at least in part on at least one of the category type label or the color diversity, at least one object from the respective plurality of objects;
    training, using the training dataset to implement a triplet loss technique, a neural network that generates style embeddings and predicts complementary objects based on corresponding style embeddings that are representative of a style of the objects included in the training dataset, wherein the triplet loss technique includes:
        providing a plurality of triplet inputs to the neural network;
        evaluating an output generated by the neural network in response to each of the plurality of triplet inputs; and
        updating the neural network based at least in part on the evaluation of the outputs;
    obtaining an embedding vector representative of a query object;
    in response to obtaining the embedding vector for the query object:
        performing, using the neural network, a transformation of the embedding vector for the query object to a style embedding vector for the query object that represents a style of the query object, wherein the transformation includes at least one of performing a linear transformation or application of an activation function on the embedding vector to generate the style embedding vector; and
        determining, using the neural network, a query object category for the query object using the embedding vector for the query object;
    identifying at least one complementary object from a corpus of objects based at least in part on:
        the query object category and an object category associated with a corpus of objects; and
        a distance between the style embedding vector for the query object and a plurality of style embedding vectors associated with the corpus of objects in a style embedding space; and
    providing, for presentation on a client device, the at least one complementary object.

2. The computer-implemented method of claim 1, further comprising:
    preprocessing each of the plurality of outfits, wherein preprocessing each of the plurality of outfits includes at least one of:
        determining whether each object of the respective plurality of objects is represented as a product image;
        determining a color diversity associated with each outfit; or
        determining whether each bounding box object includes more than one category type label.

3. The computer-implemented method of claim 2, wherein the product image is an image that consists of the visual representation of the object and a neutral background.

4. The computer-implemented method of claim 1, wherein each of the plurality of outfits includes a plurality of bounding box objects and the plurality of bounding box objects includes three or more category type labels.

5. A computing system, comprising:
    one or more processors; and
    a memory storing program instructions that, when executed by the one or more processors, cause the one or more processors to at least:
        generate a training dataset that includes a plurality of objects;
        train, using the training dataset to implement a triplet loss technique, a neural network that generates style embeddings and predicts complementary objects based on corresponding style embeddings that are representative of a style of the plurality of objects included in the training dataset, wherein the triplet loss technique includes:
            providing a plurality of triplet inputs to the neural network;
            evaluating an output generated by the neural network in response to each of the plurality of triplet inputs; and
            updating the neural network based at least in part on the evaluation of the outputs;
        obtain an image including a visual representation of a query object;
        provide the query object to the trained neural network;
        determine, using the trained neural network, an embedding vector for the query object that is representative of the query object;
        determine, using the trained neural network, a transformation of the embedding vector for the query object to a style embedding vector for the query object that represents a style of the query object, wherein the transformation includes performing at least one of a linear transformation or application of an activation function on the embedding vector to generate the style embedding vector;
        identify, based at least in part on distances between the style embedding vector for the query object and a plurality of style embedding vectors associated with a corpus of objects, at least one complementary object from the corpus of objects; and
        provide, for presentation on a client device, the at least one complementary object.

6. The computing system of claim 5, wherein the plurality of style embedding vectors represents a respective style of each object in the corpus of objects.

7. The computing system of claim 6, wherein identification of the at least one complementary object is based at least in part on a respective distance between the respective style embedding vector of the at least one complementary object and the style embedding vector of the query object.

8. The computing system of claim 5, wherein the program instructions that, when executed by the one or more processors, further cause the one or more processors to at least:
    identify a product content item associated with the query object, wherein the product content item includes a metadata associated with the query object; and
    provide the product content item to the trained neural network to identify the at least one complementary object.

9. The computing system of claim 5, wherein each object in the corpus of objects includes a respective category type label associated with each object, and wherein the program instructions that, when executed by the one or more processors, further cause the one or more processors to at least:
obtain a target category type label; and
identify the at least one complementary object based at least in part on the target category type label.

10. The computing system of claim 9, wherein the category type label includes at least one of:
a shirt;
a jacket;
a coat;
a skirt;
a pant;
a jewelry object;
a hat;
a bag;
an accessory; or
a shoe.

11. The computing system of claim 5, wherein the at least one complementary object includes a plurality of complementary objects that form a complementary ensemble.

12. The computing system of claim 5, wherein the query object includes at least one of:
a object;
a decor object;
a landscaping object; or
an event decoration object.

13. The computing system of claim 5, wherein the program instructions that, when executed by the one or more processors, further cause the one or more processors to at least preprocess the image to isolate the query object.

14. The computing system of claim 5, wherein a category type label associated with the at least one complementary object is different from a second category type label associated with the query object.

15. A computer-implemented method, comprising:
obtaining a curated dataset presenting a plurality of outfits, each of the plurality of outfits including a respective plurality of objects;
generating a training dataset from the respective plurality of objects, wherein generating the training dataset includes removing at least one object from the respective plurality of objects based on a color diversity of the at least one object;
training, using the training dataset to implement a triplet loss technique, a neural network to learn generating style embeddings and predict complementary objects based on corresponding style embeddings that are representative of a style of the respective plurality of objects included in the training dataset, wherein:
the triplet loss technique includes providing a plurality of triplet inputs to the neural network;
evaluating an output generated by the neural network in response to each of the plurality of triplet inputs; and
updating the neural network based at least in part on the outputs;
obtaining a query object;
generating an embedding vector representative of the query object;
determining, using the neural network, a style embedding vector for the query object, wherein the determining comprises transforming the embedding vector to a style embedding vector that represents a style of the query object;
identifying at least one complementary object based at least in part on the style embedding vector of the query object and a plurality of style embedding vectors associated with a corpus of objects; and
providing, for presentation on a client device, the at least one complementary object.

16. The computer-implemented method of claim 15, wherein each respective outfit includes at least three objects.

17. The computer-implemented method of claim 16, further comprising:
for each of the plurality of outfits, isolating each object into a bounding box object representative of the object, and wherein each bounding box object is provided as the training input to the neural network.

18. The computer-implemented method of claim 15, wherein at least one of the plurality of outfits is represented in a set of images.

19. The computer-implemented method of claim 1, wherein identifying the at least one complementary object includes:
determining a plurality of style clusters based on a plurality of distances between the plurality of style embeddings; and
determining the at least one complementary to include clustered objects of a first style cluster from the plurality of style clusters.

20. The computer-implemented method of claim 15, wherein the transformation includes at least one of a linear transformation or application of an activation function.

* * * * *

UNITED STATES PATENT AND TRADEMARK OFFICE
CERTIFICATE OF CORRECTION

| | | |
|---|---|---|
| PATENT NO. | : 12,488,255 B1 | Page 1 of 1 |
| APPLICATION NO. | : 16/918873 | |
| DATED | : December 2, 2025 | |
| INVENTOR(S) | : Chenyi Li et al. | |

It is certified that error appears in the above-identified patent and that said Letters Patent is hereby corrected as shown below:

In the Claims

Claim 12, Column 19, Line 26, change:
"a object;"

To:
--a fashion object;--

Signed and Sealed this
Twenty-seventh Day of January, 2026

John A. Squires
*Director of the United States Patent and Trademark Office*